United States Patent
Druker

(10) Patent No.: US 10,536,276 B2
(45) Date of Patent: Jan. 14, 2020

(54) ASSOCIATING IDENTICAL FIELDS ENCRYPTED WITH DIFFERENT KEYS

(71) Applicant: International Business Machines Corporation, Armonk, NY (US)

(72) Inventor: David G. Druker, Salt Lake City, UT (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 15/797,456

(22) Filed: Oct. 30, 2017

(65) Prior Publication Data
US 2019/0132133 A1    May 2, 2019

(51) Int. Cl.
  *H04L 29/06* (2006.01)
  *H04L 9/32* (2006.01)
  *G06F 21/62* (2013.01)
  *G06F 21/60* (2013.01)

(52) U.S. Cl.
  CPC .......... *H04L 9/3242* (2013.01); *G06F 21/602* (2013.01); *G06F 21/6218* (2013.01); *H04L 63/0435* (2013.01); *H04L 63/0442* (2013.01)

(58) Field of Classification Search
  CPC ............. H04L 63/0435; H04L 63/0442; H04L 9/3242; G06F 21/602; G06F 21/6218
  USPC ...................................................... 380/277
  See application file for complete search history.

(56) References Cited

U.S. PATENT DOCUMENTS

| | | | |
|---|---|---|---|
| 6,192,473 B1* | 2/2001 | Ryan, Jr. | G06F 21/445 380/277 |
| 7,266,689 B2 | 9/2007 | Douceur et al. | |
| 7,574,598 B2 | 8/2009 | Douceur et al. | |
| 8,135,132 B2 | 3/2012 | Hopkins et al. | |
| 9,251,355 B2 | 2/2016 | Freeman et al. | |
| 2002/0004784 A1* | 1/2002 | Forbes | G06F 21/606 705/51 |
| 2002/0034300 A1* | 3/2002 | Thuvesholmen | H04L 9/0643 380/256 |

(Continued)

OTHER PUBLICATIONS

Anonymous, "Cryptographically Computing Per-User Unique Identifiers That Cannot Be Mapped to the Underlying ECM System's ID," An IP.com Prior Art Database Technical Disclosure, IP.com No. IPCOM000237490D, Jun. 19, 2014, pp. 1-3, http://ip.com/IPCOM/000237490.

(Continued)

*Primary Examiner* — Syed A Zaidi
(74) *Attorney, Agent, or Firm* — Michael D. Purdham

(57) ABSTRACT

Aspects of the present disclosure relate to identifying identical fields encrypted with different keys. A first field of a first data set is identified for encryption. A first hash value is generated for the first field. The first field is encrypted with a first encryption key to generate a first encrypted value. A second field of a second data set is identified for encryption. A second hash value is generated for the second field. The second field is encrypted with a second encryption key to generate a second encrypted value. The first hash value is compared to the second hash value, and in response to a determination that the first and second hash values are identical, the first and second data sets are associated. The association between the first and second data sets is stored.

20 Claims, 7 Drawing Sheets

(56) References Cited

U.S. PATENT DOCUMENTS

| | | | | |
|---|---|---|---|---|
| 2002/0090087 A1* | 7/2002 | Tamura | ............... | H04N 7/165 |
| | | | | 380/210 |
| 2002/0199001 A1* | 12/2002 | Wenocur | ............ | G06Q 10/107 |
| | | | | 709/227 |
| 2004/0221159 A1* | 11/2004 | Douceur | ............. | H04L 9/3236 |
| | | | | 713/176 |
| 2010/0217987 A1* | 8/2010 | Shevade | ............ | G06F 21/6272 |
| | | | | 713/175 |

OTHER PUBLICATIONS

IBM, "Intrinsic Handles for Cryptographic Keys," An IP.com Prior Art Database Technical Disclosure, IP.com No. IPCOM000178176D, Jan. 19, 2009, pp. 1-4, http://ip.com/IPCOM/000178176.

"Public Key Encryption and Digital Signature: How do they work?," White Paper, 2004, CGI Group Inc., pp. 1-12.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

* cited by examiner

ASSOCIATING IDENTICAL FIELDS ENCRYPTED WITH DIFFERENT KEYS

BACKGROUND

The present disclosure relates generally to the field of computer security, and more particularly to encryption.

Encryption is used in computer systems to prevent unauthorized parties from accessing data. Plaintext data can be encrypted by applying an encryption key to generate ciphertext, rendering the data unintelligible. The data can only be decrypted by applying the corresponding encryption key to reverse the order of the encryption algorithm, converting the ciphertext back into plaintext. There are a variety of different encryption methodologies, including symmetric and asymmetric encryption.

SUMMARY

Embodiments of the present disclosure disclose a method, computer program product, and system for identifying identical fields encrypted with different keys. A first field of a first data set can be identified for encryption. A first hash value can be generated for the first field. The first field can be encrypted with a first encryption key to generate a first encrypted value. A second field of a second data set can be identified for encryption. A second hash value can be generated for the second field. The second field can be encrypted with a second encryption key to generate a second encrypted value. The first hash value can be compared to the second hash value, and in response to a determination that the first and second hash values are identical, the first and second data sets can be associated. The association between the first and second data sets can then be stored.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
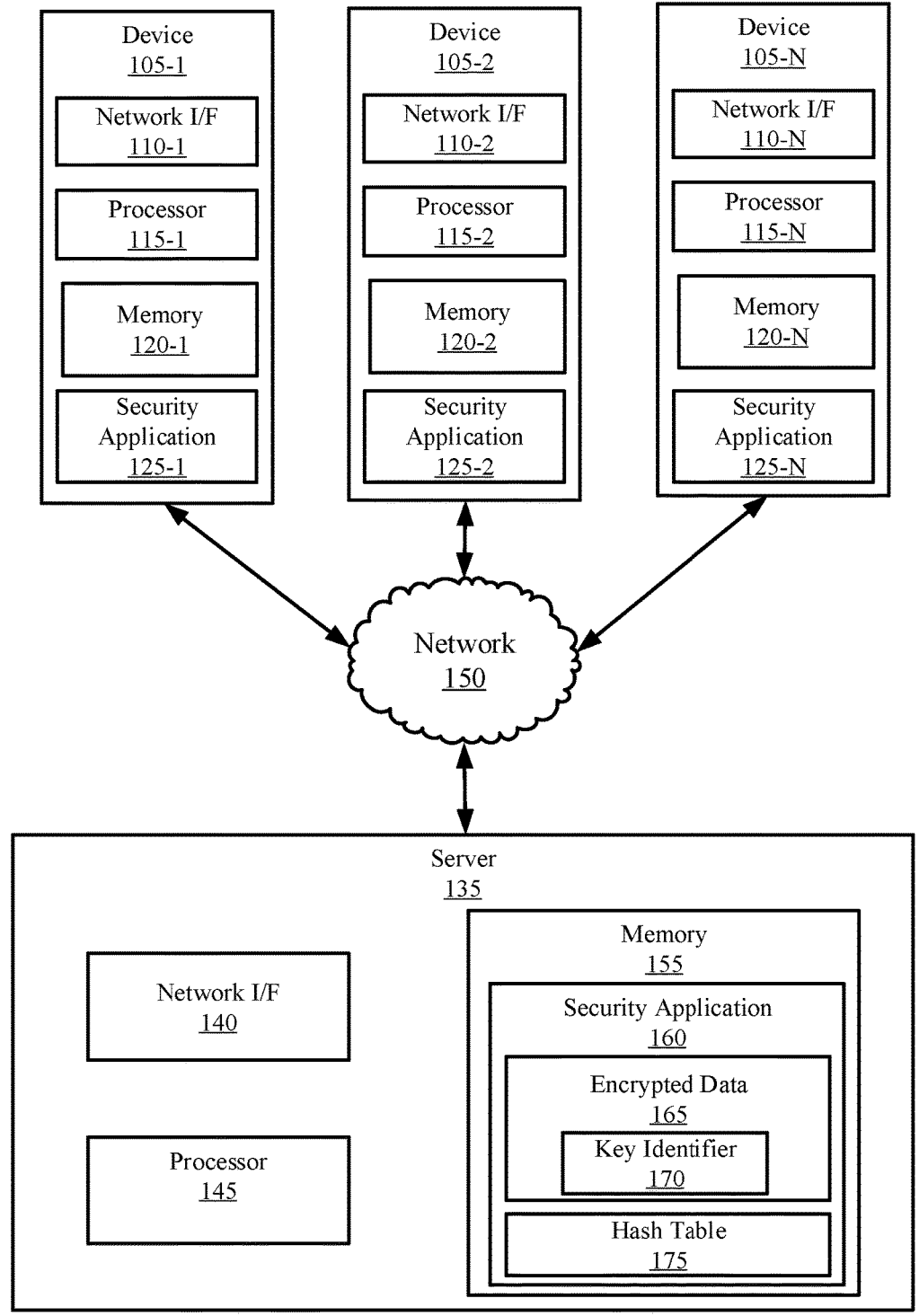
FIG. 1 is a block diagram illustrating an example computing environment in which embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computer security, and more particularly to encryption. While the present disclosure is not necessarily limited to such applications, various aspects of the disclosure can be appreciated through a discussion of various examples using this context.

Computer systems utilize encryption to protect data from being read or accessed by unauthorized parties (e.g., individuals, organizations, computer systems, etc.). To do so, plaintext data is encrypted via an encryption key, which includes an encryption algorithm to convert the plaintext into ciphertext. The encryption process is a "two-way road" per se, as the ciphertext can be converted back (e.g., decrypted) into the original plaintext by applying the corresponding key. In symmetric encryption systems, the same key is used to encrypt and decrypt the data. In asymmetric encryption system, a different key can be used to encrypt and decrypt the data, respectively.

Both symmetric and asymmetric encryption systems can utilize rotating encryption keys. In these instances, the encryption key frequently changes. For example, the encryption key can be altered on a per transaction basis or a set time period basis. As an example, transient-key systems generate and assign key pairs for brief intervals of time, rather than pairing keys to specific individuals, servers, or organizations. After the time period has lapsed, the transient-key expires and can be destroyed. Employing rotating encryption keys can be highly beneficial in symmetric encryption systems. In symmetric systems, the risk of compromising data security can be higher than in asymmetric systems, as the same key is used during both encryption and decryption. Accordingly, in symmetric encryption systems, a secure channel is typically used to ensure the key is not intercepted as it is transmitted to an authorized recipient. To mitigate risk in symmetric encryption key systems, the encryption key can be altered frequently. This approach can ensure the system is more secure, as it makes searching the encrypted data for patterns significantly harder, as different data sets can be encrypted by different algorithms.

In systems where the encryption key frequently changes, the plaintext can still be retrieved, since a token for obtaining the corresponding encryption key is stored as metadata within the encrypted data. However, systems implementing multiple keys can mask identical fields, such as user identities. The identical fields (e.g., user identities, time stamps, products, locations, machines, programs, etc.) include the same exact data, but because they are encrypted with different keys, they have multiple representations (e.g., appear as different encrypted values). In long-running data masking systems, the same fields can have hundreds or thousands of representations or occurrences within the data. Accordingly, it can be difficult to acquire an accurate count of the number of times the identical field is present. If identical fields encrypted with multiple keys are user identity fields, it can be difficult to acquire useful metrics relating to that specific user identity (e.g., billing metrics, licensing metrics, bandwidth considerations, resource allocation, etc.).

Aspects of the present disclosure associate identical fields encrypted with different keys via hash generation. Specifically, each identical field (e.g., user identity, location, machine, time, date, program, product etc.) can be hashed prior to each encryption cycle. Because the cryptographic hash function yields the same output for each respective identical field, the multiple representations generated by encrypting the fields with different keys are traceable. The hash values for each identical field can be associated with the corresponding encrypted values and key identifiers referencing the encryption keys used to generate those encrypted values. Various analytics can then be collected regarding the identical fields, including the number of users accessing the system and/or the relative activity of each user identity. Further, the hash values can be used to select data for decryption using the corresponding key identifiers.

Embodiments of the present disclosure enable users (e.g., cloud providers, system administrators, clients, thirds parties, etc.) to perform secure analytics on various aspects of a system (e.g., a distributed computing system). For example, analytics can be performed regarding various identical field types (e.g., user identities, time periods, locations, machines, products etc.) associated with the system. This is performed by generating unique hashes for each identical field, and linking each hash value to each identical field's multiple encrypted representations. Because the hash values are generally cryptographically unfeasible to reverse back into the plaintext, the system remains secure.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 are configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 include optional input devices (e.g., a keyboard, mouse, scanner, video camera, or other input device), and/or any commercially available or custom software (e.g., browser software, communications software, server software, natural language processing software, search engine and/or web crawling software, filter modules for filtering content based upon predefined parameters, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The devices 105 and server 135 include security applications 125-1, 125-2 . . . 125-N (collectively security applications 125) and 160, respectively. The security applications 125 and 160 can be configured to identify identical fields (e.g., user identities, IP addresses, media access control (MAC) addresses, email addresses, time periods, locations, machines, etc.) encrypted with different keys. In some embodiments, the security applications 125 and 160 include an encryption engine. The encryption engine can include a key rotation, which can encrypt data transmitted over the network 150 with different keys, typically per time period or transaction. For example, the encryption keys used to encrypt data transmitted by devices 105 can change every minute (e.g., each minute time-stamp can correspond to a different key). Additionally, the encryption keys used to encrypt data transmitted by devices 105 can change per communication transaction (e.g., per email, data packet, or action transmitted over network 150). By rotating the encryption keys, sets of data can be encrypted by different encryption algorithms, making the encrypted values harder to search for patterns, and thus harder for an unauthorized recipient (e.g., hacker or data interceptor) to crack. Rotating the encryption keys does not prevent the authorized users from decrypting the data, as a key identifier (e.g., token) can be stored with the encrypted value, to associate the encrypted value with the appropriate decryption key.

The security applications 125 and/or 160 include a hash engine. The hash engines can include a cryptographic hash function (e.g., Secure Hash Algorithm-1 (SHA1) or MD5), to generate hash values for plaintext data included on the devices 105 and/or server 135. By running the plaintext through the hash function, a hash value (e.g., an irreversible or one-way hash) can be generated. The hash value can be used to verify the integrity of data. For example, device 105-1 can generate a hash value via a SHA-1 hash engine for plaintext included in a file prior to transmitting the file over the network 150. The file including the plaintext can then be transmitted to the server 135, and the server can extract the plaintext and provide the plaintext to the same SHA-1 hash engine to determine whether the data was modified (e.g., tampered with) during transmission over the network 150. Because the hash engine is generally collision proof, if the hash value generated prior to transmission over the network 150 is the same as the hash value generated subsequent to transmission over the network 150, then the plaintext data integrity is verified.

In some embodiments, the server 135 can use hash values to track (e.g., count, identify, or associate) identical data fields (e.g., user identities, locations, timings, machines) transmitted by the devices 105. Because the data transmitted by the devices 105 can be encrypted with different keys, identical fields can have multiple representations (e.g., appear as different encrypted values). In long-running data masking systems that employ encryption key rotations, it can be difficult to associate the identical fields with each other. To successfully associate identical fields encrypted with different keys, a hash value can be generated prior to each encryption cycle, which remains uniform if the same cryptographic hash function is used to generate the hash. The hash value can then be used to associate the identical field values encrypted with different keys. Specifically, the devices 105-1 can use a local hash engine, or alternatively, a hash engine provided by the server 135 (e.g., over network 150), to generate hash values for each set of identical fields prior to encrypting the identical fields with different keys. The hash values can then be transmitted to the server 135 and stored in a hash table 175, along with the encrypted data 165 and a key identifier 170 referencing the corresponding encryption key. The hash table 175, encrypted data 165, and key identifier 170 can all be stored in memory 155 located on the server 135.

In some embodiments, the hash engines 125 and/or 160 are replaced by another obfuscation engine. The obfuscation engine can be configured to generate a secure (e.g., irreversible or protected) constant data output for each identical field. For example, the obfuscation engine can be a tokenization engine. The tokenization engine can be configured to tokenize each identical field prior to each encryption iteration, such that the identical fields encrypted by multiple keys can be associated via the tokenization system. In some embodiments, the obfuscation engine can be an encryption engine. The encryption engine can be configured to encrypt each identical field with the same key (e.g., a constant encryption key) prior to each encryption key rotation, such that the identical fields encrypted by multiple keys can be associated via the constant encryption key.

In some embodiments, communication transmitted by the devices 105 and/or server 135 includes a set of data fields (e.g., distinct elements, columns, rows, etc. for storage), and the set of data fields can be parsed in order to identify the field(s) that require hash generation and encryption. For example, specific data fields can be selected for hash generation and encryption. In an example, if a user is browsing a website, only the identity of the user may be sought for encryption, while the metadata regarding the website is not important. In this example, only the identity of the user is encrypted. Conversely, in some embodiments, the entire record (e.g., the user identity including the website metadata) is selected for hash generation and encryption.

Reference will now be made to an example data transfer scenario between the device 105-1 and server 135. In this example, the device 105-1 transmits a first and second email to the server 135, at two different times $t_1$ and $t_2$, from the same email address (e.g., the email address is an identical field). Further, the emails are encrypted with a transient key, such that the keys used to encrypt the emails are different at $t_1$ vs. $t_2$. Prior to transmitting the first email, the security application 125-1 first identifies the user identity field, and then generates a hash value ($H_1$) for the user identity field (the email address). The email address is then encrypted with the transient key at $t_1$. A key identifier ($K_1$) is stored as metadata with the encrypted value ($E_1$), such that the encryption key can be referenced as decryption is required. The encrypted value ($E_1$), the key identifier ($K_1$), and the hash value for the email address ($H_1$) are then transmitted over network 150 to the server 135. The server 135 stores the encrypted value ($E_1$) and key identifier ($K_1$) in the encrypted data 165, and stores the hash value ($H_1$) in the hash table 175. The original email (e.g., the plaintext of the email) is not transmitted to the server 135.

Prior to transmitting the second email, the security application 125-1 identifies the email address as the identical field. The security application 125 then generates a hash value for the second email ($H_1$), which is the same as the hash value for the first email because the email address is identical. The security application 125-1 then encrypts the email address at $t_2$, to generate an encrypted value ($E_2$) and a key identifier ($K_2$) referencing the key used to encrypt the second email at $t_2$. The encrypted value ($E_2$), the key identifier ($K_2$), and the hash value for the email address ($H_1$) are then transmitted over network 150 to the server 135. The server 135 stores the encrypted value ($E_2$) and key identifier ($K_2$) in the encrypted data 165, and stores the hash value $H_1$ in the hash table 175. The security application 160 then associates ($E_1$) with ($E_2$) by using the hash value ($H_1$), which remains constant as the same hash function is applied to the same email address.

The server 135 can then utilize the association of encrypted values via the hash value to provide useful metrics about the overall system. For example, the number of instances of each hash value can be used for future bandwidth considerations, allocated computing resources, billing purposes, licensing metrics, and the like. Additionally, the number of different hash values stored in the hash table 175 can provide an indication relating to the number of unique user identities (e.g., when the identical field is a user identity). This can be beneficial, for example, in licensing scenarios, as the number of unique users utilizing a product (e.g., a cloud computing service) can be counted. If the number of hashes in the hash table 175 exceed the number of granted license, a determination can be made that unlicensed users are accessing the system. Further, the relative activity of each user, as indicated by the hash associations, can be used to determine if dynamic scaling (e.g., cloud bursting) is necessary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

Figure 2:
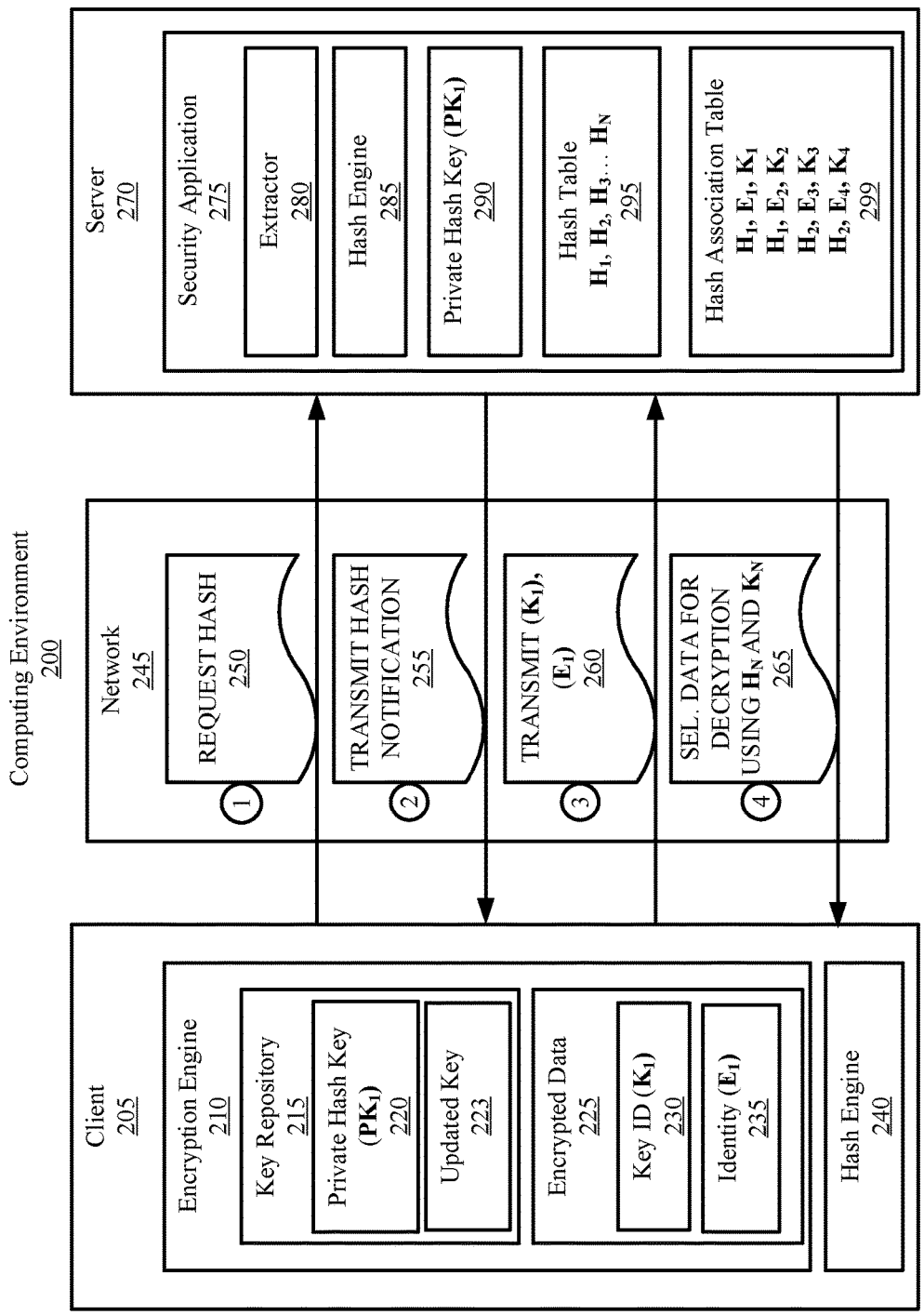
FIG. 2 is a block diagram illustrating communication between a server and client to associate identical identity fields encrypted with different keys, in accordance with embodiments of the present disclosure.

FIG. 2 is a block diagram illustrating an example computing environment 200 with communication between a client 205 and a server 270 over a network 245. In some embodiments, client 205, server 270, and network 245 are the same or substantially similar to the corresponding element(s) in FIG. 1. That is, in some embodiments, client 205 is the same or substantially similar to device 105, server 270 is the same or substantially the same as server 135, and network 245 is the same or substantially the same as network 150. FIG. 2 illustrates the server 270 associating multiple representations of a user identity field of the client 205 via a hash association table 299.

The client 205 can include an encryption engine 210, which can be configured to encrypt/decrypt data. The encryption engine 210 can include one or more encryption algorithm(s). Any suitable encryption algorithm can be used by the encryption engine, including Advanced Encryption Standard (AES) algorithms. For example, the encryption engine 210 can implement encryption algorithms such as Blowfish, Triple-DES, Rijndael, Serpent, Twofish, RC6, MARS, etc. In some embodiments, the encryption engine 210 can implement two or more different encryption algorithms. One or more encryption key(s) can be applied to the corresponding algorithm(s). The encryption key(s) can be used to randomly select algorithmic processes present in the underlying encryption algorithm, which can be used to securely encrypt and decrypt data. The encryption key(s) can be any suitable size (e.g., 128 bits, 256 bits, 2048 bits), and can depend on the selected encryption algorithm(s).

The encryption process performed by the encryption engine 210 can be symmetric or asymmetric. That is, in some embodiments, the same key can be used to encrypt and decrypt data. Alternatively, in some embodiments, a public key can be used to encrypt data, and a private secret key (e.g., maintained by a user or organization) can be used to decrypt the data.

In some embodiments, the encryption engine 210 includes a key rotation, which alters the encryption keys, either periodically or per transaction/event. By rotating encryption keys, the encrypted data can be harder to search for patterns. The data can still be accessible however, as tokens for referencing corresponding keys can be stored as metadata with the encrypted values. For example, in some embodiments, the encryption engine 210 includes a transient-key system. In these embodiments, key pairs can be generated and associated with intervals of time rather than individuals or organizations (e.g., as typically done in private-key systems). In another example, encryption keys are rotated per transaction, such as per message or email transmission. However, encryption keys can also be rotated in any other suitable manner. For example, in some embodiments, encryption keys are only rotated as key management personal changes (e.g., an individual managing the encryption keys leaves the company).

The encryption engine 210 can include a key repository 215. The key repository 215 can store (e.g., in a table) all relevant encryption keys, and can be used to access/organize active encryption keys. In some embodiments, the key repository 215 includes a tokenization system. For example, a token generated by the tokenization system can correspond to each key stored in the key repository, such that each key can be referenced by its token. This can enable the encryption engine 210 to select the appropriate key for decryption. For example, in a rotating key system, key identifier tokens stored as metadata with the encrypted values are cross-referenced via the tokenization system in order to decrypt values encrypted by previously used keys.

The client 205 can include a hash engine 240 and the server 270 can include a hash engine 285. The hash engines 240 and 285 can include one or more cryptographic hash functions which can be configured to generate hash values (e.g., checksums or digests) for data inputs. In some embodiments, the cryptographic hash functions map data sets of arbitrary size to hash values of fixed size (e.g., input "abc" returns a 64 character output, while input "Hello" also returns a 64 character output). The cryptographic hash function can be collision proof (e.g., for a given input text space), such that two distinct data inputs do not generate the same hash value. In some embodiments, the hash engines 240 and 285 can be coupled with the encryption engine 210, to generate keyed-hashes. Keyed-hashes, such as keyed-hash message authentication codes (HMACs), can be used not only verify the integrity of data via the hash, but verify the authenticity of the parties through a private key. For example, the client 205 and server 270 can each include a private hash key ($PK_1$) 220 and 290, respectively, which is used to encrypt the digest generated by the hash engines 240 and 285. Accordingly, if the encrypted values generated for the client 205 and server 270 match, then the data is determined to be authenticated.

Reference will now be made to an example data flow scenario between the client 205 and the server 270 (e.g., as indicated by the circled numbers 1-4). The data flow scenario illustrates the server 270 associating identical user identity fields encrypted with different keys via a security application 275. The client 205 can first prepare data (e.g., a file, message, document, etc.) for transmission over the network 245 to the server 270. In doing so, the client 205 requests a hash value at step 250. In some embodiments, the client 205 interfaces the server 270 over the network 245 through a web browser (e.g., a dynamic web page) controlled by the security application 275. The security application 275 can receive the hash request (e.g., from a script in the browser) and can process the request.

After the hash is requested, the security application 275 can be configured to identify (e.g., parse) the identical field for hash generation. In some embodiments, the identical field is a user identity field which provides an indication regarding the user associated with the communication. For example, the user identity field can be an email address, MAC address, IP address, user name, client number, etc. The security application 275 can identify the identical field for hash generation in any manner. In some embodiments, the security application 275 includes an extractor 280 to extract plaintext fields from the communication received from the client 205 in order to analyze the fields to determine whether they are identical fields. In some embodiments, the server 270 stores a repository of device identifiers, and selects the identity field corresponding to a specific client on the repository (e.g., by comparing the extracted plaintext to an identifier in the repository). In some embodiments, the security application 275 is configured to identify the identical field by analyzing the characters included in the plaintext (e.g., the IP address format, MAC address format, or "@.com" present in emails). However, the identical field selected for hash generation can be identified in any other suitable manner.

In some embodiments, the security application 275 does not identify the identical field, but generates the identical field. For example, when the security application 275 receives communication from the client 205, the security application 275 can be configured to tag the communication with an identical field (e.g., a user name, client number, address, time-stamp, etc.). In some embodiments, the security application 275 tags the client 205 with a token which references the client. Generating a unique identical field for each client can reduce redundancy complications between two clients with identical user identities. For example, if two clients have the same user name or identifier, tagging each client with a unique identifier can provide differentiation between the clients.

In some embodiments, the client 205 can pre-select the identical field, and forward the selected identical field to the security application 275 to be used for hash generation. This can reduce bandwidth and computing resources associated with parsing the communication (e.g., the file, document, email etc.) for the identical field via the server 270 over the network 245.

After the identical field is selected for hash generation, a hash value (e.g., or other obfuscated value, depending on the obfuscation engine) can be generated for the identical field. In some embodiments, the security application 275 generates the hash value for the identical field. Specifically, the hash engine 285 can generate a hash value for the identical field by inputting the identical field into a cryptographic hash function (e.g., SHA-256). In some embodiments, the hash engine 285 is pushed to the client 205 over the network 245 (e.g., through a script in a browser). In these embodiments, the hash is generated using the client's hardware resources. These embodiments hide the plaintext from security application 275. This can be beneficial as the plaintext data does not have to be transmitted over the network 245, which can lower the risk of data interception or middle-man attacks. It also meets cloud computing requirements when the operator of client 205 does not wish the operator of server 270 to ever access the plaintext data. However, in some embodiments, the hash value is generated on the server 270. Alternatively, in some embodiments, the client 205 identifies the identical field, and generates the hash value using a hash engine 240 local to the client 205 machine.

In some embodiments, the security application 275 generates a keyed-hash (e.g., an HMAC) for the identical field. This can include further encrypting the hash value with a private hash key ($PK_1$) 290. The private hash key ($PK_1$) 290 can be stored on the server 270 and a copy of the private hash key ($PK_1$) 220 can be stored on the client 205, to verify integrity and authenticity of the user identity field. After the hash value is generated, it can be stored in a hash table 295.

In some embodiments, each device and/or user identity corresponds to a unique hash value. Tokenization can be implemented to link each user identity to each corresponding hash value.

After the hash value is generated, the server 270 can transmit a hash notification. This is illustrated at step 255. The hash notification can include a message that the hash was successfully processed for the user identity. In some embodiments, the hash notification includes an indication that the hash value was stored on the server 270. In embodiments in which the client 205 generates the hash value, the client 205 can transmit a hash notification to the server 270, and can transfer the hash value to the server 270 over the network 245.

After the hash notification is received by the client 205, the client 205 can encrypt the identity field using the encryption engine 210. The user identity field can be encrypted with an updated key 223, which is the most recent key in the key rotation. After the updated key 223 is applied to encrypt the user identity field and all other relevant data, the encrypted representation of the user identity ($E_1$) 235 and the Key ID ($K_1$) 230 referencing the updated key 223 are stored with the encrypted data 225.

The client 205 then transmits the Key ID ($K_1$) 230 and the encrypted representation of the user identity ($E_1$) 235 to the server 270. This is illustrated at step 260. The security application 275 then associates the encrypted representation of the user identity ($E_1$) and the Key ID ($K_1$) with the hash value ($H_1$) corresponding to the user identity. The security application 275 can store the association in the hash association table 299, which links the hash values to the respective encrypted representations and key identifiers.

The hash association table 299 and hash table 295 can then be used to provide useful metrics about the overall system. For example, the hash table 295 can provide an indication regarding the number of unique users accessing the system. This can be beneficial in licensing scenarios, in which a limited number of licenses are issued. Further, this can provide an indication into the number of users, devices, gateways, computing nodes, virtual machines, etc. accessing the system. The amount of entities accessing the system can be used to dynamically scale the system as required.

The hash association table 299 can provide an indication regarding the relative activity of each user identity. For example, if encryption keys are rotated per transaction, the number of times the hash value is associated with different encrypted representations can indicate the number of transactions performed by the user identity. Further, in transient-key systems, the number of instances a specific encrypted representation is returned provides an indication for the relative activity of each user identity over time (e.g., per month, per day, per hour, etc. depending on the key rotation rate). By gauging the relative activity of each user, the server 270 can be configured to allocate computing resources (e.g., allocate memory, processing power, bandwidth etc. to specific user identities or machines) accordingly. Ultimately, the amount of activity performed by each user identity can be considered to dynamically scale the server 270 as required. Analytics on user identities correlated on multiple identical fields can also provide cybersecurity insights and metrics. For example, certain patterns of transactions by the same user identity, or conversely, the same type of transaction by multiple identities, over a specific time period, might be indicative of an ongoing attack, security breach, or other anomaly.

Analytics can also be acquired in embodiments in which a time-stamp is the identical field. For example, if client 205 transmits five transactions at 12:00 PM, and the key rotation is varied per transaction, the identical field (e.g., the time stamp) "12:00 PM" can have five distinct representations. In order to associate the five representations of "12:00 PM," a hash value can be generated prior to the encryption cycle. The hash value of 12:00 PM will then be identical for each occurrence, and thus can be used to associate the five transactions. This can be used to determine the number of transactions per time-stamp. For example, each unique encrypted representation linked to the same hash value can provide the number of transactions per time period. This can be used to dynamically scale the system as necessary, as the relatively activity per time period can be acquired.

In some embodiments, the hash association table 299 can be used to select data for decryption. This is illustrated at step 265. Specifically, the server 270 can utilize the hash values ($H_N$) to decrypt data associated with those hash values. Because the hash association table 299 can associate each hash value (e.g., user identity) with specific encrypted representations ($E_N$) and Key IDs ($K_N$), the server 270 can select encrypted data 225 for decryption using the hash association table 299. For example, all encrypted data regarding a second user identity (e.g., associated with a corresponding hash value $H_2$) can be decrypted by transmitting each Key ID associated with $H_2$ to the client 205. The keys can then be applied to each encrypted value by referencing the transmitted Key ID's and tokens stored as metadata with the encrypted values.

Figure 3A:
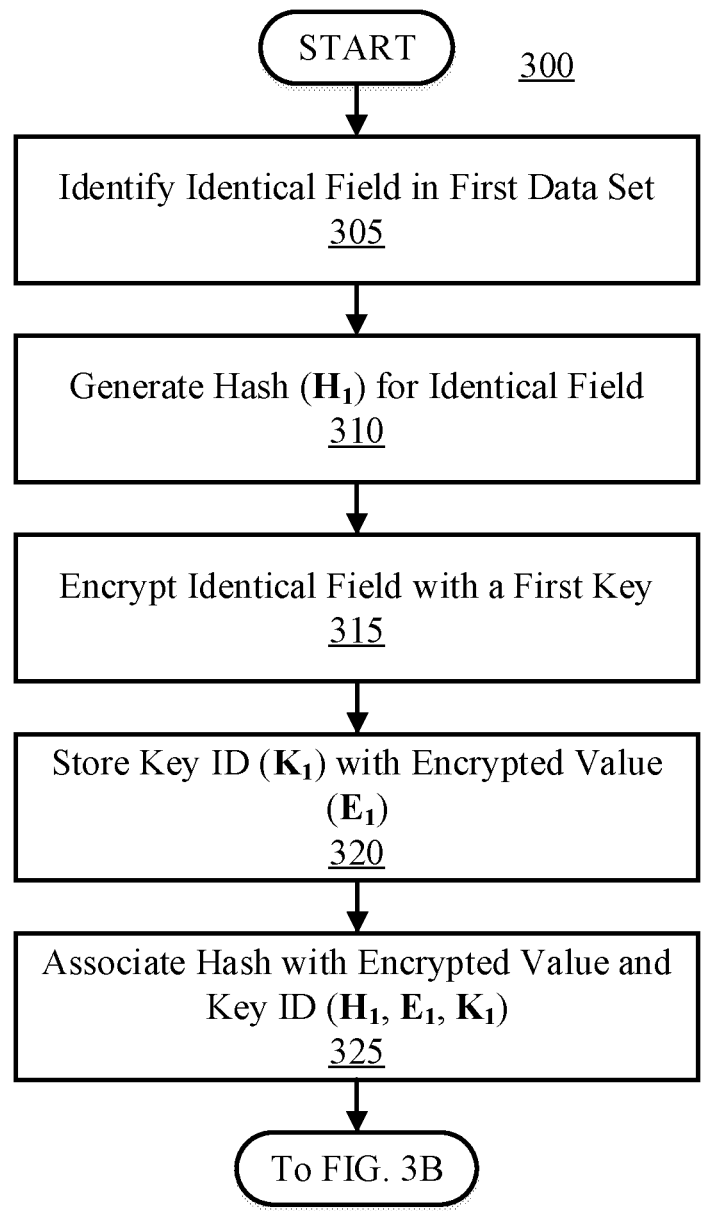
FIG. 3A and FIG. 3B are flow charts collectively illustrating an example method for associating an identical field encrypted with a first and second encryption key via hash generation, in accordance with embodiments of the present disclosure.
Figure 3B:
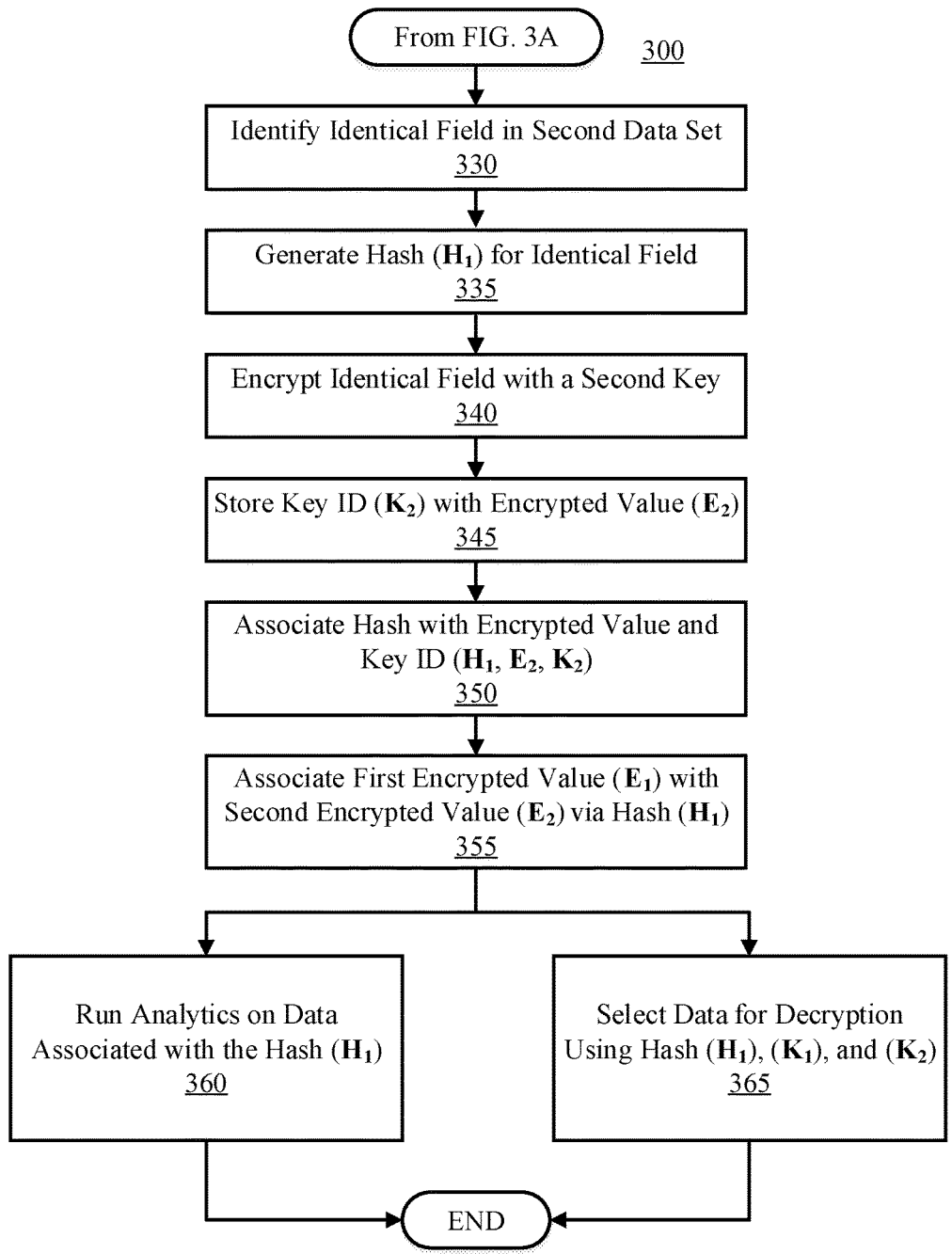

FIGS. 3A and 3B are flow diagrams illustrating a process 300 to associate identical fields encrypted with different keys using hash values, according to an illustrative embodiment. Process 300 is illustrated spanning across FIG. 3A into 3B. The connection between FIGS. 3A and 3B is illustrated by reference to the preceding or following step in the respective figure. Specifically, FIG. 3B is a continuation FIG. 3A, both of which collectively illustrate process 300.

Referring now to FIG. 3A, process 300 starts by identifying an identical field in a first data set. This is illustrated at step 305. The identical field can be identified in any manner. As previously mentioned, in some embodiments, a data extractor (for example extractor 280 of FIG. 2) can extract plaintext from files or documents, in order to make the plaintext searchable. In some embodiments, the identical field can be identified by parsing plaintext to identify characters associated with an identical field (e.g., an IP address, MAC address format, time-stamp, etc.). In some embodiments, the identical field can be identified based on an identity repository (e.g., by comparing characters within the plaintext to the defined identities in the repository). In some embodiments, the identical field can be generated (e.g., tagged by a server, or automatically generated by a client), and identified based on the generation.

After the identical field is identified, a hash value is generated for the identical field. This is illustrated at step 310. The hash value can be generated by inputting the identical field into a cryptographic hash function (e.g., SHA-1, SHA-256, HAVAL, JH, MD5, Skein, Snefru, Spectral Hash, etc.) The hash value can then be stored in memory. In some embodiments, the hash value is generated by a client device, as prompted by a server (e.g., hash engine 240 of client 205 of FIG. 2 generates the hash). In some embodiments, the hash value is generated by a hash engine located on a server (e.g., hash engine 285 on server 270 of FIG. 2). In some embodiments, the server pushes the hash engine over a network to be executed by the client's hardware. However, the hash value can be generated and stored in any manner.

After the hash value is generated for the identical field of the first data set, the identical field is encrypted with a first encryption key. This is illustrated at step 315. A Key Identifier (ID) ($K_1$) referencing the first encryption key is then stored as metadata with the encrypted value ($E_1$) including the encrypted representation of the identical field. This is illustrated at step 320. The hash value ($H_1$) is then associated with the encrypted value ($E_1$) and the Key ID ($K_1$). This is illustrated at step 325. The association can be stored on a server in a hash association table (e.g., hash association table 299 located on server 270 of FIG. 2).

Referring now to FIG. 3B, method 300 can proceed to step 330, where an identical field in a second data set is located. The identical field in the second data set can be identified as described above. In the embodiment depicted in FIG. 3B, the identical field is the same as the identical field identified in FIG. 3A. After the identical field in the second data set is identified, a hash value ($H_1$) is generated for the identical field. This is illustrated at step 335. In the embodiment depicted in FIG. 3B, the hash value ($H_1$) is the same as the hash value ($H_1$) in FIG. 3A, as the identical field is input through the same cryptographic hash function (assuming the cryptographic hash function is collision proof).

The identical field in the second data set is then encrypted with a second encryption key. This is illustrated at step 340. This generates a second encrypted value ($E_2$). A second key identifier ($K_2$) is then stored as metadata with the second encrypted value ($E_2$). This is illustrated at step 345. The hash value ($H_1$) is then associated with the second encrypted value ($E_2$) and the second Key ID ($K_2$). This is illustrated at step 350. The second association ($H_1$, $E_2$, $K_2$) can be stored on a server in a hash association table with the first association ($H_1$, $E_1$. And $K_1$). The first encrypted value ($E_1$) can then be associated with the second encrypted value ($E_2$) using the hash association via ($H_1$). This is illustrated at step 355.

After the first encrypted value ($E_1$) is associated with the second encrypted value ($E_2$), various useful metrics can be acquired. This is illustrated at step 360. For example, all encrypted representations associated with the hash value ($H_1$) can be identified. This can provide an indication into the activity of a user identity. For example, if each transaction transmitted by the user identity associated with ($H_1$) is encrypted with a different key, the number of encrypted representations associated with ($H_1$) can be used to make a determination in the number of transactions completed by that identity. Further, if encrypted representations change daily (e.g., a transient key rotation that assigns a new encryption key each day), the number of times each encrypted representation ($E_N$) appears can provide an indication in the number of transactions completed per day. This can be used to identify time periods with increased activity. Additionally, the number of unique hashes ($H_N$) can provide an indication into the number of user identities accessing the system. This can be useful to determine whether or not the number of unique user identities exceeds an allotted number permitted to access the system (e.g., in licensing scenarios).

By performing analytics on the amount of activity associated with each user identity, various actions can be issued to accommodate each user identity. For example, by identifying time periods with a substantial activity increase, cloud bursting can be deployed to provide the necessary computing resources. The system can be dynamically scaled based on historical data stored in the hash association table. For example, if a given user identity represented by hash value ($H_1$) has twice the computing activity of another identity represented by hash value ($H_2$), the system can be configured to allocate twice the computing resources to the user identity represented by ($H_1$). Various additional actions can be implemented based on the activity associated with each user identity.

The hash value ($H_1$) and the first and second key identifiers ($K_1$) and ($K_2$), respectively can be used to select data for decryption. This is illustrated at step 365. All of the encryption key identifiers ($K_N$) linked to the hash value ($H_1$) can be used to decrypt data associated with specific keys. For example, if encryption keys are rotated daily, and all the data associated with a given day is sought for decryption, the key identifier associated with that day can be selected by using ($H_N$).

Though various embodiments are described to with reference to identity fields (e.g., IP addresses, MAC addresses, usernames, emails, user numbers, etc.) any identical data field in the input form can similarly be identified (e.g., time, date, location, machine, product, etc.) via hash generation. Further, though hash generation is contemplated to track identical data fields, other obfuscation methods can similarly be used. For example, encrypting the data with the same encryption key prior to encrypting the data with the key rotation can similarly provide a secure static representation of the identity field. Further, tokenization can be applied to each identity field prior to each encryption cycle to provide a secure static representation of each identity field.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
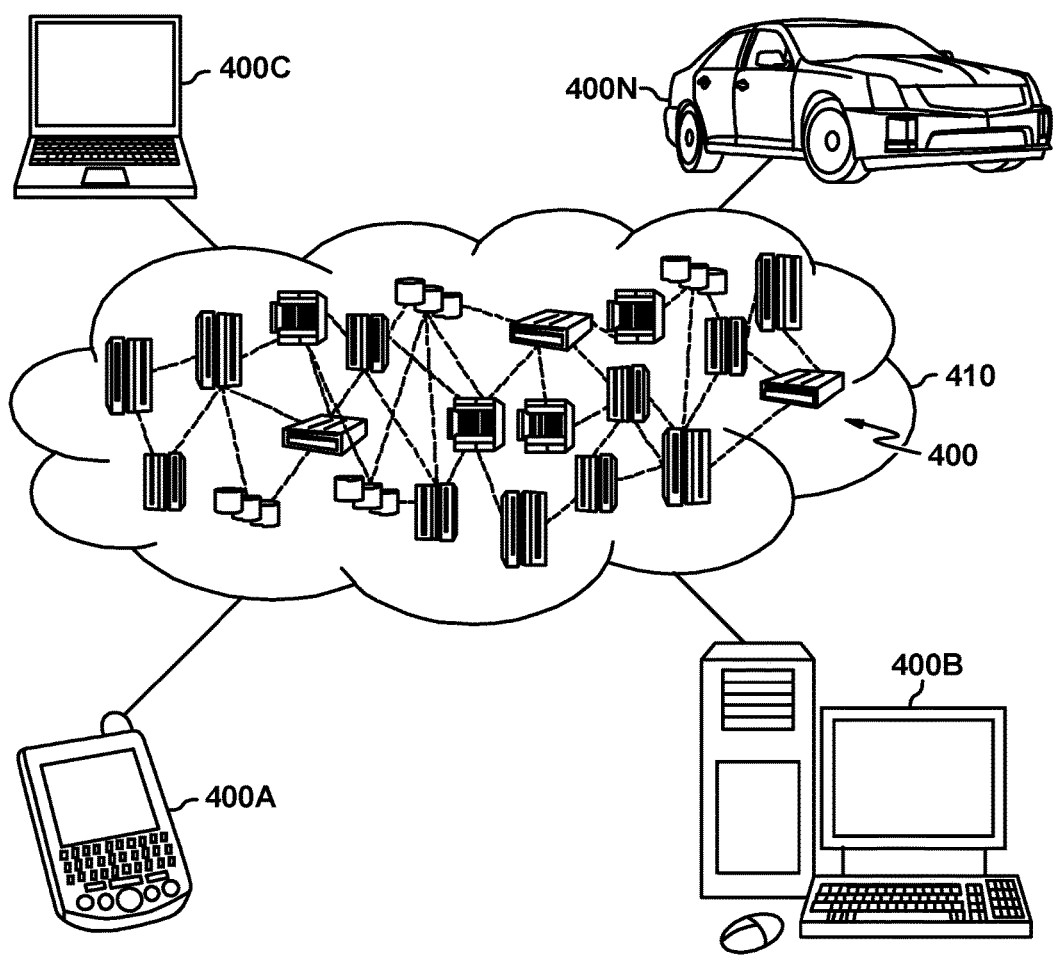
FIG. 4 is a diagram illustrating a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B (e.g., devices 105, server 135, client 205, and server 270) laptop computer 400C (e.g., devices 105, server 135, client 205, and server 270), and/or automobile computer system 400N can communicate. Nodes 400 can communicate with one another. They can be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
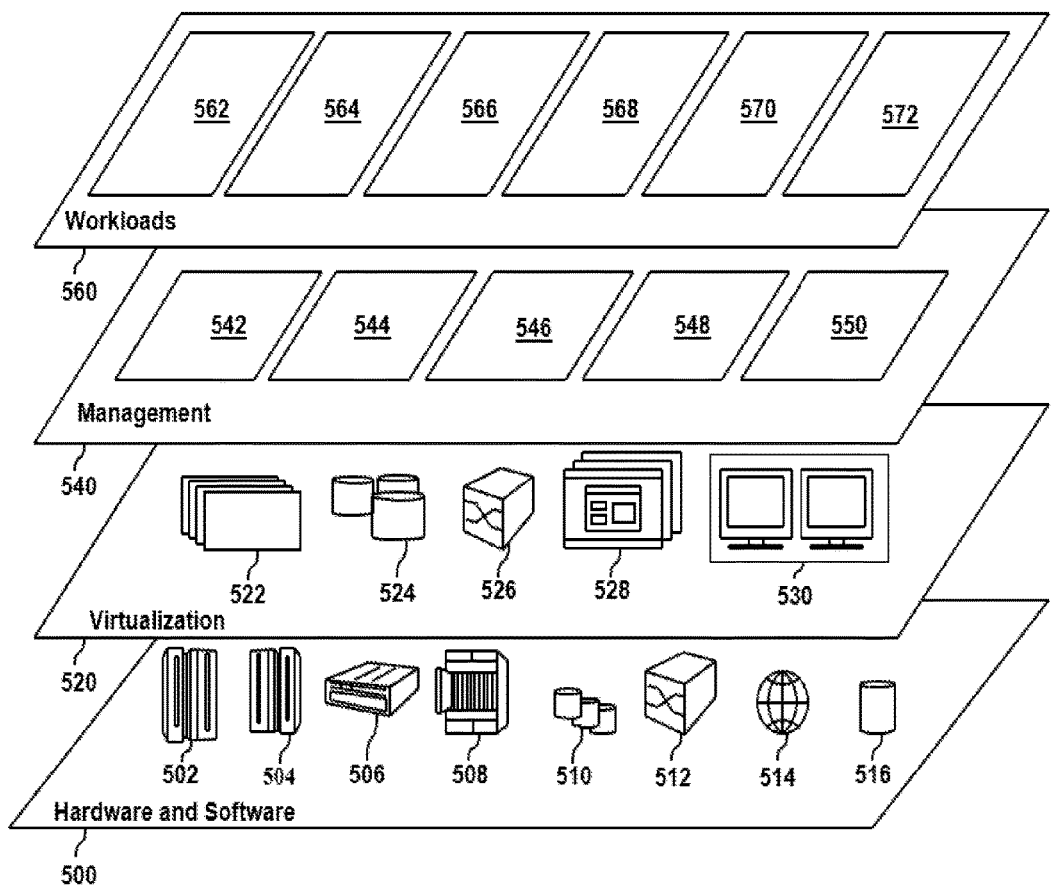
FIG. 5 is a block diagram illustrating abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities can be provided: virtual servers 522; virtual storage 524; virtual networks 526, including virtual private networks; virtual applications and operating systems 528; and virtual clients 530.

In one example, management layer 540 can provide the functions described below. Resource provisioning 542 provides dynamic procurement of computing resources and other resources that are utilized to perform tasks within the cloud computing environment. For example, resource provisioning 542 can allocate additional computing resources to devices (e.g., devices 105 of FIG. 1) which are indicated to have high activity. Metering and Pricing 544 provide cost tracking as resources are utilized within the cloud computing environment, and billing or invoicing for consumption of these resources. In one example, these resources can include application software licenses. In some embodiments, Metering and Pricing 544 indicates the number of allotted licenses to machines (e.g., devices 105 or client 205) in the system. Security provides identity verification for cloud consumers and tasks, as well as protection for data and other resources. In some embodiments, security can include one or more security applications described herein (e.g., security applications 125, 160, and 275). User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment can be utilized. Examples of workloads and functions which can be provided from this layer include: mapping and navigation 562; software development and lifecycle management 564; virtual classroom education delivery 566; data analytics processing 568; transaction processing 570; and identifying an identifiable media 572.

Figure 6:
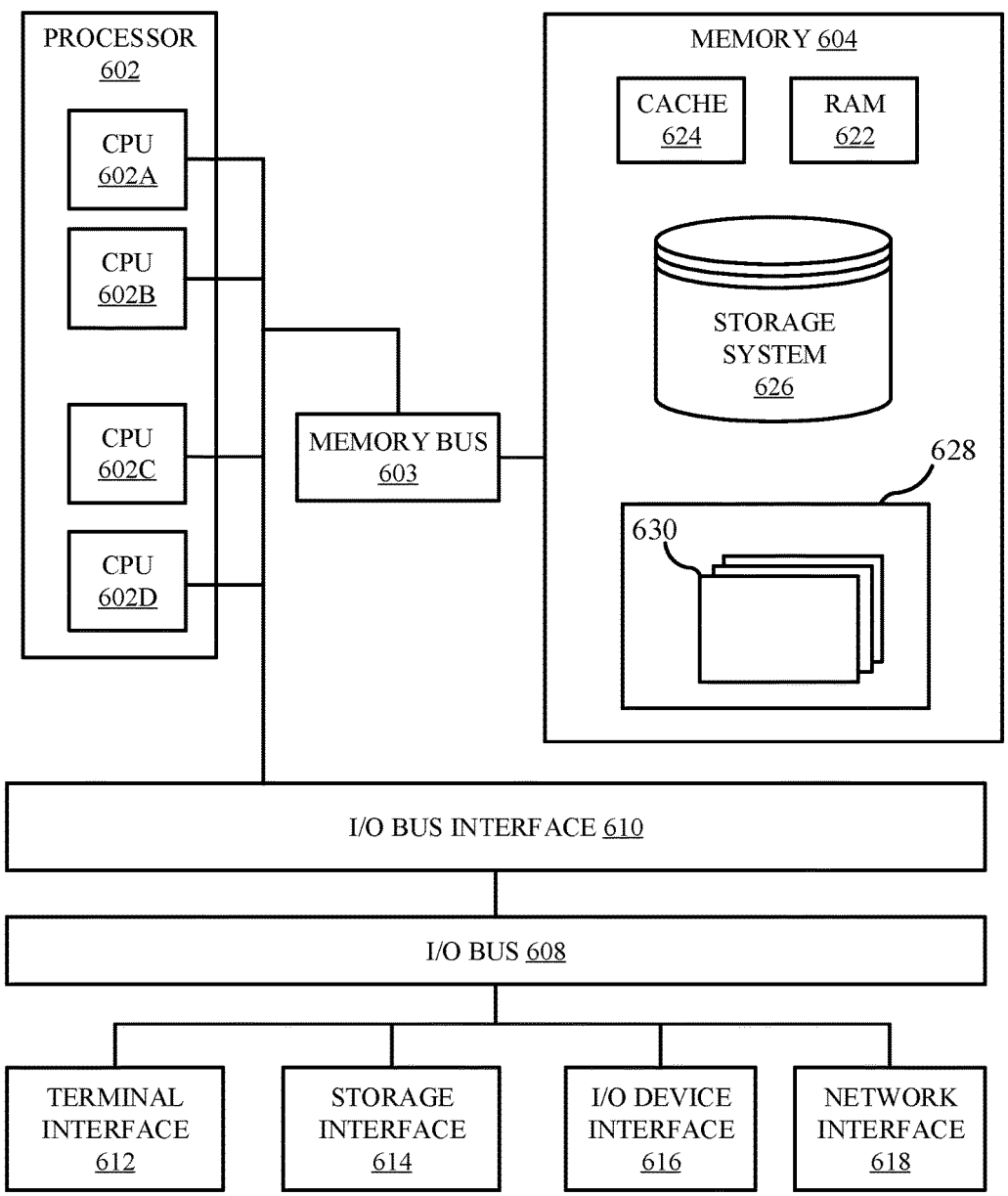
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105, server 135, client 205, and server 270) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 601 can comprise one or more CPUs 602, a memory subsystem 604, a terminal interface 612, a storage interface 616, an I/O (Input/Output) device interface 614, and a network interface 618, all of which can be communicatively coupled, directly or indirectly, for inter-component communication via a memory bus 603, an I/O bus 608, and an I/O bus interface unit 610.

The computer system 601 can contain one or more general-purpose programmable central processing units (CPUs) 602A, 602B, 602C, and 602D, herein generically referred to as the CPU 602. In some embodiments, the computer system 601 can contain multiple processors typical of a relatively large system; however, in other embodiments the computer system 601 can alternatively be a single CPU system. Each CPU 602 can execute instructions stored in the memory subsystem 604 and can include one or more levels of on-board cache.

System memory 604 can include computer system readable media in the form of volatile memory, such as random access memory (RAM) 622 or cache memory 624. Computer system 601 can further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 can include at least one program product having a set (e.g., at least one) of program modules that are configured to carry out the functions of various embodiments.

One or more programs/utilities 628, each having at least one set of program modules 630 can be stored in memory 604. The programs/utilities 628 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 628 and/or program modules 630 generally perform the functions or methodologies of various embodiments.

In some embodiments, the program modules 630 of the computer system 601 can include a security module. The security module can include computer instructions to identify identical data fields encrypted with different keys. The security module can include one or more hash engines and one or more encryption engines. The security module can be configured to generate hashes for identity fields and associate the hashes with encrypted representations of the identity fields. The hash association can be stored, and the security module can be configured to run analytics on the hash values of the identity fields.

Although the memory bus 603 is shown in FIG. 6 as a single bus structure providing a direct communication path among the CPUs 602, the memory subsystem 604, and the I/O bus interface 610, the memory bus 603 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 can, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices can be connected directly to one or more system I/O buses.

In some embodiments, the computer system 601 can be a multi-user mainframe computer system, a single-user system, or a server computer or similar device that has little or no direct user interface, but receives requests from other computer systems (clients). Further, in some embodiments, the computer system 601 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components can have greater or lesser complexity than as represented in FIG. 6, components other than or in addition to those shown in FIG. 6 can be present, and the number, type, and configuration of such components can vary.

As discussed in more detail herein, it is contemplated that some or all of the operations of some of the embodiments of methods described herein can be performed in alternative orders or can not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure can not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   identifying, for a first data set, a first field for encryption, wherein the first field is associated with a field type;
   generating a first hash value for the first field;
   encrypting the first field with a first encryption key, wherein encrypting the first field generates a first encrypted value;
   tokenizing the first encryption key to generate a first encryption key token;
   storing the first encryption key token with the first encrypted value;
   identifying, for a second data set, a second field for encryption, wherein the second field has the same field type as the first field;
   generating a second hash value for the second field;
   encrypting the second field with a second encryption key, wherein encrypting the second field generates a second encrypted value;
   tokenizing the second encryption key to generate a second encryption key token;
   storing the second encryption key token with the second encrypted value;
   comparing the first hash value to the second hash value;
   associating, in response to a determination that the first hash value is identical to the second hash value, the first data set with the second data set; and
   storing the association.

2. The method of claim 1, further comprising:
   associating the first hash value with the first encrypted value and the first encryption key token;
   storing the association between the first hash value, the first encrypted value, and the first encryption key token;
   associating the second hash value with the second encrypted value and the second encryption key token; and
   storing the association between the second hash value, the second encrypted value, and the second encryption key token.

3. The method of claim 2, further comprising:
   selecting, using the association between the first hash value, the first encrypted value, and the first encryption key token, the first encrypted value for decryption; and
   decrypting the first encrypted value.

4. The method of claim 1, wherein the first field is erased in response to the first encryption key token being stored with the first encrypted value.

5. The method of claim 1, wherein the first field for encryption is identified in response to generating the first field for encryption.

6. The method of claim 1, wherein the first field is plaintext, wherein the first field plaintext is extracted from the first data set, and wherein the first field is identified in response to extracting the first field from first data set.

7. The method of claim 1, wherein the first and second hash values are keyed-hashes.

8. A computer program product comprising a computer readable storage medium having program instructions embodied therewith, wherein the computer readable storage medium is not a transitory signal per se, the program instructions executable by a processor to cause the processor to perform a method comprising:
   identifying, for a first data set, a first plaintext field for encryption, wherein the first plaintext field is associated with a field type;
   generating a first hash value for the first plaintext field;
   encrypting the first plaintext field with a first encryption key, wherein encrypting the first plaintext field generates a first encrypted value;
   tokenizing the first encryption key to generate a first encryption key token;
   storing the first encryption key token with the first encrypted value;
   identifying, for a second data set, a second plaintext field for encryption, wherein the second plaintext field has the same field type as the first plaintext field;
   generating a second hash value for the second plaintext field;
   encrypting the second plaintext field with a second encryption key, wherein encrypting the second plaintext field generates a second encrypted value;
   tokenizing the second encryption key to generate a second encryption key token;
   storing the second encryption key token with the second encrypted value;
   comparing the first hash value to the second hash value;
   associating, in response to a determination that the first hash value is identical to the second hash value, the first data set with the second data set; and
   storing the association.

9. The computer program product of claim 8, further comprising:
   associating the first hash value with the first encrypted value and the first encryption key token;
   storing the association between the first hash value, the first encrypted value, and the first encryption key token;
   associating the second hash value with the second encrypted value and the second encryption key token; and
   storing the association between the second hash value, the second encrypted value, and the second encryption key token.

10. The computer program product of claim 9, further comprising:
    selecting, using the association between the first hash value, the first encrypted value, and the first encryption key token, the first encrypted value for decryption; and
    decrypting the first encrypted value to generate the first plaintext field.

11. The computer program product of claim 8, wherein the first field is erased in response to the first encryption key token being stored with the first encrypted value.

12. The computer program product of claim 8, wherein the first field for encryption is identified in response to generating the first field for encryption.

13. The computer program product of claim 8, wherein the first plaintext field is extracted from the first data set, wherein the first plaintext field is identified in response to extracting the first plaintext field from the first data set.

14. The computer program product of claim 8, wherein the first and second hash values are keyed-hashes.

15. A system comprising:
   at least one memory; and
   a processor, the processor being configured to perform a method comprising:
      identifying, for a first data set, a first field for encryption, wherein the first field is associated with a field type;
      generating a first hash value for the first field;
      encrypting the first field with a first encryption key, wherein encrypting the first field generates a first encrypted value;
      tokenizing the first encryption key to generate a first encryption key token;
      storing the first encryption key token with the first encrypted value;
      identifying, for a second data set, a second field for encryption, wherein the second field has the same field type as the first field;
      generating a second hash value for the second field;
      encrypting the second field with a second encryption key, wherein encrypting the second field generates a second encrypted value;
      tokenizing the second encryption key to generate a second encryption key token;
      storing the second encryption key token with the second encrypted value;
      comparing the first hash value to the second hash value;
      associating, in response to a determination that the first hash value is identical to the second hash value, the first data set with the second data set; and
      storing the association.

16. The system of claim 15, further comprising:
   associating the first hash value with the first encrypted value and the first encryption key token;
   storing the association between the first hash value, the first encrypted value, and the first encryption key token;
   associating the second hash value with the second encrypted value and the second encryption key token; and
   storing the association between the second hash value, the second encrypted value, and the second encryption key token.

17. The system of claim 16, further comprising:
   selecting, using the association between the first hash value, the first encrypted value, and the first encryption key token, the first encrypted value for decryption; and
   decrypting the first encrypted value.

18. The system of claim 15, wherein the first field is erased in response to the first encryption key token being stored with the first encrypted value.

19. The system of claim 15, wherein the first field for encryption is identified in response to generating the first field for encryption.

20. The system of claim 15, wherein the first and second hash values are keyed-hashes.

* * * * *